United States Patent
Takimoto et al.

(10) Patent No.: US 9,670,316 B2
(45) Date of Patent: Jun. 6, 2017

(54) AROMATIC POLYCARBONATE RESIN MOLDING

(71) Applicant: IDEMITSU KOSAN CO., LTD., Chiyoda-ku (JP)

(72) Inventors: Masami Takimoto, Sodegaura (JP); Takahiro Torii, Chiba (JP); Mitsugu Nakae, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/035,288

(22) PCT Filed: Nov. 10, 2014

(86) PCT No.: PCT/JP2014/079764
§ 371 (c)(1),
(2) Date: May 9, 2016

(87) PCT Pub. No.: WO2015/068844
PCT Pub. Date: May 14, 2014

(65) Prior Publication Data
US 2016/0272758 A1    Sep. 22, 2016

(30) Foreign Application Priority Data

Nov. 11, 2013 (JP) ................. 2013-233431

(51) Int. Cl.
| | |
|---|---|
| C08G 64/00 | (2006.01) |
| C08G 64/06 | (2006.01) |
| C08K 5/55 | (2006.01) |
| C08L 69/00 | (2006.01) |
| C08L 71/02 | (2006.01) |
| C08K 5/41 | (2006.01) |
| F21V 8/00 | (2006.01) |
| C08G 63/02 | (2006.01) |

(52) U.S. Cl.
CPC ............... *C08G 64/06* (2013.01); *C08K 5/41* (2013.01); *C08K 5/55* (2013.01); *C08L 69/00* (2013.01); *C08L 71/02* (2013.01); *G02B 6/0065* (2013.01)

(58) Field of Classification Search
CPC .............................. C08G 64/06; C08K 5/41
USPC ............... 528/176, 190, 193, 194, 196, 198
See application file for complete search history.

(56) References Cited

U.S. PATENT DOCUMENTS

| | | | |
|---|---|---|---|
| 2009/0162628 | A1 | 6/2009 | Kurokawa et al. |
| 2014/0042646 | A1 | 2/2014 | Kurokawa et al. |
| 2014/0364546 | A1 | 12/2014 | Okamoto et al. |

FOREIGN PATENT DOCUMENTS

| | | |
|---|---|---|
| JP | 2002-60609 A | 2/2002 |
| JP | 2006-169451 A | 6/2006 |
| JP | 2013-139097 A | 7/2007 |
| JP | 2007-204737 A | 8/2007 |
| JP | 4069364 B2 | 4/2008 |
| JP | 2008-163070 A | 7/2008 |
| JP | 2013-231899 A | 11/2013 |
| WO | 2011/083635 A1 | 7/2011 |
| WO | 2013/088796 A1 | 6/2013 |

OTHER PUBLICATIONS

International Search Report Issued Feb. 10, 2015 in PCT/JP2014/079764 Filed Nov. 10, 2014.

*Primary Examiner* — Terressa Boykin
(74) *Attorney, Agent, or Firm* — Oblon, McClelland, Maier & Neustadt, L.L.P.

(57) ABSTRACT

Provided is an aromatic polycarbonate resin molded body, which is obtained by molding a resin molding material containing an aromatic polycarbonate resin (A), in which: the molded body has a thin-walled portion having a thickness of 0.5 mm or less; the molded body has an o-hydroxyacetophenone content of 1 ppm by mass or less and a nitrogen atom content of 15 ppm or less; and the molded body is free of an absorption maximum in a wavelength range of from 500 nm to 600 nm.

10 Claims, No Drawings

AROMATIC POLYCARBONATE RESIN MOLDING

TECHNICAL FIELD

The present invention relates to an aromatic polycarbonate resin molded body, and more specifically, to an aromatic polycarbonate resin molded body reduced in yellowing and excellent in light transmission property.

BACKGROUND ART

A polycarbonate resin is excellent in, for example, transparency, mechanical properties, thermal properties, electrical properties, and weatherability, and has been used in an optical molded article, such as a light-guiding plate, a lens, or an optical fiber, through the utilization of its characteristics. However, the light transmittance of the polycarbonate resin serving as one of the indicators representing its transparency is lower than that of, for example, a polymethyl methacrylate (PMMA). Therefore, a surface light source body including a light-guiding plate made of the polycarbonate and a light source has a problem in that its luminance is low.

Accordingly, a method of improving a luminance or a light transmittance in the light-guiding plate made of the polycarbonate has hitherto been proposed. In, for example, PTL 1, there is a disclosure of an aromatic polycarbonate resin composition and a light-guiding plate each including an aromatic polycarbonate resin and a thermoplastic resin whose refractive index differs from that of the aromatic polycarbonate resin by 0.001 or more, and each having specific optical characteristics. In PTL 2, there is a disclosure of an aromatic polycarbonate resin composition for a light-guiding plate having a satisfactory transmittance and a satisfactory hue, the composition being obtained by incorporating, into an aromatic polycarbonate resin, a specific amount of a polyalkylene glycol having a specific structure or a fatty acid ester thereof.

In PTL 3, there is a disclosure of a resin composition excellent in light transmittance and luminance, and capable of resisting molding at high temperature, the composition being obtained by blending an aromatic polycarbonate resin with a specific amount of a polyoxytetramethylene-polyoxyethylene glycol having a specific structure, and an optical molded article using the composition.

A polycarbonate resin composition to be used in the production of a light-guiding plate or the like has started to be molded in a wide temperature region in association with the thinning of a molded article thereof, and hence has been required to have: such high heat stability that its yellowing, a reduction in its light transmittance, or the like does not occur under a high-temperature condition; and durability at the time of the use of the product.

In PTL 4, there is a disclosure that the incorporation of a diphosphite compound having a specific structure and an alicyclic epoxy compound into an aromatic polycarbonate resin provides a molded article that is excellent in heat stability in high-temperature molding, light transmittance, and luminance, and that does not cause discoloration or cracking even when exposed to a high-temperature and high-humidity environment for a long time period.

CITATION LIST

Patent Literature

PTL 1: JP 2002-60609 A
PTL 2: JP 4069364 B2
PTL 3: WO 2011/083635 A1
PTL 4: WO 2013/088796 A1

SUMMARY OF INVENTION

Technical Problem

However, for example, when an aromatic polycarbonate resin composition is used in a light-guiding plate application, from the viewpoint that a thin-walled and large light-guiding plate is obtained, molding under a high-temperature condition largely exceeding 300° C. is performed for improving the flowability of the resin composition. A molded body obtained by such molding under a high-temperature condition is liable to cause yellowing or a reduction in light transmittance.

The problem to be solved by the present invention is to provide an aromatic polycarbonate resin molded body that has a thin-walled portion, is reduced in yellowing, and is excellent in light transmission property.

Solution to Problem

The inventors of the present invention have made extensive investigations, and as a result, have found that the problem can be solved by using an aromatic polycarbonate resin molded body in which the content of a specific component is equal to or less than a predetermined amount. Thus, the inventors have completed the present invention.

That is, according to one embodiment of the present invention, there is provided an aromatic polycarbonate resin molded body to be described below.

<1> An aromatic polycarbonate resin molded body, which is obtained by molding a resin molding material comprising an aromatic polycarbonate resin (A), wherein:

the molded body has a thin-walled portion having a thickness of 0.5 mm or less;

the molded body has an o-hydroxyacetophenone content of 1 ppm by mass or less and a nitrogen atom content of 15 ppm or less; and the molded body is free of an absorption maximum in a wavelength range of from 500 nm to 600 nm.

<2> The aromatic polycarbonate resin molded body according to Item <1>, wherein a length in a longitudinal direction of the molded body is 60 mm or more, and a thickness of a region accounting for at least 80% of the molded body is 0.7 mm or less.

<3> The aromatic polycarbonate resin molded body according to Item <1> or <2>, wherein when a total signal intensity observed in a chemical shift region of from 1.5 ppm or more to 1.9 ppm or less at a time of measurement of a proton NMR spectrum is defined as 100, the molded body has a ratio of a total signal intensity observed in a chemical shift region of from 6.3 ppm or more to 6.7 ppm or less of 0.15 or less.

<4> The aromatic polycarbonate resin molded body according to any one of Items <1> to <3>, wherein the resin molding material further comprises a polyether compound (b1) having a polyoxyalkylene structure.

<5> The aromatic polycarbonate resin molded body according to any one of Items <1> to <4>, wherein the resin molding material further comprises an acid-generating compound (b2).

<6> The aromatic polycarbonate resin molded body according to Item <5>, wherein the acid-generating compound (b2) comprises at least one selected from a boronic acid anhydride and a sulfonate.

<7> The aromatic polycarbonate resin molded body according to any one of Items <4> to <6>, wherein a content of the polyether compound (b1) is from 0.01 part by mass to 5 parts by mass with respect to 100 parts by mass of the aromatic polycarbonate resin (A).

<8> The aromatic polycarbonate resin molded body according to any one of Items <5> to <7>, wherein a content of the acid-generating compound (b2) is from 0.0001 part by mass to 0.5 part by mass with respect to 100 parts by mass of the aromatic polycarbonate resin (A).

<9> The aromatic polycarbonate resin molded body according to any one of Items <1> to <8>, wherein the aromatic polycarbonate resin (A) has a viscosity-average molecular weight (Mv) of from 10,000 to 50,000.

<10> A light-guiding plate, comprising the aromatic polycarbonate resin molded body of any one of Items <1> to <9>.

Advantageous Effects of Invention

According to the present invention, the aromatic polycarbonate resin molded body that has a thin-walled portion having a thickness of 0.5 mm or less, is reduced in yellowing, and is excellent in light transmission property can be provided.

DESCRIPTION OF EMBODIMENTS

[Aromatic Polycarbonate Resin Molded Body]

An aromatic polycarbonate resin molded body of the present invention (hereinafter referred to as "molded body of the present invention" or simply "molded body") is an aromatic polycarbonate resin molded body, which is obtained by molding a resin molding material containing an aromatic polycarbonate resin (A), wherein: the molded body has a thin-walled portion having a thickness of 0.5 mm or less; the molded body has an o-hydroxyacetophenone content of 1 ppm by mass or less and a nitrogen atom content of 15 ppm or less; and the molded body is free of an absorption maximum in a wavelength range of from 500 nm to 600 nm. In the present invention, the phrase "has a thin-walled portion having a thickness of 0.5 mm or less" means that part or the entirety of the molded body has a thickness of 0.5 mm or less.

The inventors of the present invention have found that when a resin molding material containing an aromatic polycarbonate is molded at a high temperature largely exceeding 300° C. for producing a molded body having a thin-walled portion having a thickness of 0.5 mm or less, its yellowing is particularly liable to occur and the yellowing is caused by o-hydroxyacetophenone.

o-Hydroxyacetophenone is a compound produced by, for example, the thermal decomposition of an aromatic polycarbonate resin. When the content of o-hydroxyacetophenone in the aromatic polycarbonate resin molded body is more than 1 ppm by mass, remarkable yellowing of the molded body occurs to be responsible for the impairment of the external appearance and performance of the molded body. From the viewpoint that the yellowing is reduced, the content of o-hydroxyacetophenone in the aromatic polycarbonate resin molded body is preferably 0.5 ppm by mass or less, more preferably 0.4 ppm by mass or less, still more preferably 0.3 ppm by mass or less, most preferably 0.2 ppm by mass or less.

The content of o-hydroxyacetophenone in the molded body of the present invention can be measured by a high-performance liquid chromatography (HPLC) method. Specifically, the content can be measured by a method described in Examples.

A method of reducing the content of o-hydroxyacetophenone in the molded body of the present invention is, for example, a method involving adding, to the polycarbonate resin molding material to be used for the production of the aromatic polycarbonate resin molded body of the present invention, at least one compound selected from a polyether compound (b1) having a polyoxyalkylene structure and an acid-generating compound (b2). The compounds are described later.

In addition, when a large amount of a basic compound is present in the aromatic polycarbonate resin molded body of the present invention, the compound tends to act on o-hydroxyacetophenone described in the foregoing to accelerate the yellowing of the molded body, and when the molded body of the present invention is a light-guiding plate, the compound is responsible for a reduction in its light-guiding performance. Among the basic compounds, an amine compound reacts with o-hydroxyacetophenone to form an imine and the imine is assumed to accelerate the yellowing. From the viewpoint, a nitrogen atom content in the molded body of the present invention is 15 ppm or less, preferably 10 ppm or less, more preferably 8 ppm or less, still more preferably 5 ppm or less.

When the basic compound, such as the amine compound, is incorporated into a polycarbonate resin, the content of the basic compound in the molded body of the present invention can be reduced by, for example, increasing the number of times of the washing of the polycarbonate resin or a stirring power at the time of the washing.

The nitrogen atom content in the molded body of the present invention can be measured by a chemiluminescence method, and specifically, the content can be measured by a method described in Examples.

In addition, the aromatic polycarbonate resin molded body of the present invention is free of an absorption maximum in the wavelength range of from 500 nm to 600 nm. It has been known that an aromatic polycarbonate resin molded body is blended with, for example, a colorant (bluing agent) having an absorption maximum in the wavelength range of from 500 nm to 600 nm for offsetting coloring in a yellow color. In the method, however, when the aromatic polycarbonate resin molding material is molded under a high-temperature condition largely exceeding 300° C. for thin-wall molding, a molded body to be obtained yellows owing to the deterioration or volatilization of the coloring agent. In the present invention, a molded body reduced in yellowing and excellent in light transmission property can be obtained without the blending of such coloring agent or the like.

In the present invention, the phrase "free of an absorption maximum in the wavelength range of from 500 nm to 600 nm" means that when 6 g of an aromatic polycarbonate resin molded body is dissolved in 50 mL of methylene chloride, and the absorption spectrum of the solution is measured with a quartz cell having an optical path length of 5 cm and a UV-visible spectrophotometer by a transmission method, no absorption maximum is present in the wavelength range of from 500 nm to 600 nm. In the present invention, it is preferred that absorption except absorption derived from the aromatic polycarbonate resin be absent in the wavelength range of from 500 nm to 600 nm. The aromatic polycarbonate resin molded body can be specifically evaluated for the presence or absence of an absorption maximum in the wavelength range of from 500 nm to 600 nm by a method described in Examples.

Further, in the aromatic polycarbonate resin molded body of the present invention, when a total signal intensity observed in a chemical shift region of from 1.5 ppm or more to 1.9 ppm or less at a time of measurement of a proton NMR spectrum is defined as 100, a ratio of a total signal intensity observed in a chemical shift region of from 6.3 ppm or more to 6.7 ppm or less is preferably 0.15 or less, more preferably 0.10 or less. When the signal intensity ratio is 0.15 or less, an aromatic polycarbonate resin molded body additionally reduced in yellowing and additionally excellent in light transmission property can be obtained. It should be noted that a signal observed in the chemical shift region of from 1.5 ppm or more to 1.9 ppm or less is derived mainly from a proton of the isopropylidene group of bisphenol A serving as the main structure of the aromatic polycarbonate resin to be used in the molded body of the present invention.

The signal intensity ratio can be determined by measuring a proton NMR spectrum. The proton NMR spectrum can be specifically measured by a method described in Examples.

The thickness of the thin-walled portion of the aromatic polycarbonate resin molded body of the present invention is 0.5 mm or less, preferably 0.45 mm or less, more preferably 0.4 mm or less, still more preferably 0.35 mm or less.

Here, as the thickness of the thinnest portion of the aromatic polycarbonate resin molded body of the present invention becomes thinner, the effects of the present invention can be exhibited to a larger extent, but a lower limit for the thickness of the thinnest portion can be set to, for example, 0.1 mm or more, 0.15 mm or more, or 0.2 mm or more.

The shape of the molded body of the present invention is not particularly limited as long as at least part of the molded body has the thin-walled portion having a thickness of 0.5 mm or less, but a molded body having a plate shape, such as a flat plate, or a curved plate or prism transfer plate having a lens effect, is preferred from the viewpoint of its application to a light-guiding plate or the like. It is preferred that a length in the longitudinal direction of the molded body to be applied to the light-guiding plate or the like be 60 mm or more, and the thickness of a region accounting for at least 80% of the molded body be 0.7 mm or less, it is more preferred that the length in the longitudinal direction be 65 mm or more, and the thickness of the region accounting for at least 80% of the molded body be 0.5 mm or less, it is still more preferred that the length in the longitudinal direction be 70 mm or more, and the thickness of the region accounting for at least 80% of the molded body be 0.45 mm or less, and it is still further more preferred that the length in the longitudinal direction be 70 mm or more, and the thickness of the region accounting for at least 80% of the molded body be 0.4 mm or less.

It should be noted that an upper limit for the length in the longitudinal direction is not particularly limited, but can be set to, for example, 300 mm or less.

In addition, a lower limit for the thickness of the region accounting for at least 80% of the molded body is not particularly limited, but can be set to, for example, 0.1 mm or more, 0.15 mm or more, or 0.2 mm or more. It should be noted that in the present invention, the phrase "the thickness of the region accounting for at least 80% of the molded body is 0.7 mm or less" means that when the molded body has, for example, a plate shape, a thickness is 0.7 mm or less in a region accounting for at least 80% of the entire area of the plate-shaped molded body.

[Polycarbonate Resin Molding Material]

The aromatic polycarbonate resin molded body of the present invention is obtained by molding the resin molding material containing the aromatic polycarbonate resin (A). That is, the kinds of the respective components to be used in the aromatic polycarbonate resin molded body of the present invention and preferred contents thereof are the same as the kinds of respective components to be used in a polycarbonate resin molding material to be described below and preferred contents thereof.

(Aromatic Polycarbonate Resin (A))

The polycarbonate resin molding material to be used in the present invention contains the aromatic polycarbonate resin (A). A resin produced by a known method can be used as the aromatic polycarbonate resin (A) without any particular limitation.

For example, a resin produced from a dihydric phenol and a carbonate precursor by a solution method (interfacial polycondensation method) or a melting method (ester exchange method), i.e., a resin produced by the interfacial polycondensation method involving causing the dihydric phenol and phosgene to react with each other in the presence of an end terminator, or by causing the dihydric phenol and diphenyl carbonate or the like to react with each other in the presence of the end terminator according to the ester exchange method or the like can be used.

Examples of the dihydric phenol can include various dihydric phenols, in particular, 2,2-bis(4-hydroxyphenyl) propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. In addition, examples thereof can also include hydroquinone, resorcin, and catechol. One kind of those dihydric phenols may be used alone, or two or more kinds thereof may be used in combination. Among them, bis(hydroxyphenyl)alkane-based phenols are preferred, and bisphenol A is particularly suitable. By using bisphenol A as the dihydric phenol, a polycarbonate resin having a bisphenol A structure can be obtained.

The carbonate precursor is, for example, a carbonyl halide, a carbonyl ester, or a haloformate, and is specifically phosgene, a dihaloformate of a dihydric phenol, diphenyl carbonate, dimethyl carbonate, diethyl carbonate, or the like.

It should be noted that the component (A) in the present invention may have a branched structure, and a branching agent may be, for example, 1,1,1-tris(4-hydroxyphenyl)-ethane, α,α',α"-tris(4-hydroxyphenyl)-1,3,5-triisopropylbenzene, phloroglucin, trimellitic acid, or 1,3-bis(o-cresol).

A monovalent carboxylic acid or a derivative thereof or a monohydric phenol can be used as the end terminator. Examples thereof can include p-tert-butyl-phenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)-perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H, 1H-perfluorooctyloxy)phenol, 2H,2H,9H-perfluorononanoic acid, and 1,1,1,3,3,3-hexafluoro-2-propanol.

It is preferred that the aromatic polycarbonate resin (A) include a polycarbonate resin including, in a main chain thereof, a repeating unit represented by the following formula (I).

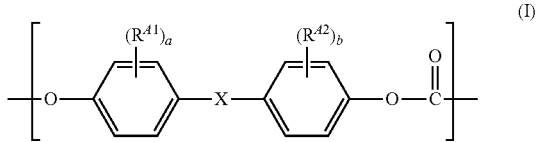

(I)

In the formula, $R^{A1}$ and $R^{A2}$ each independently represent an alkyl group or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4.

Examples of the alkyl group represented by each of $R^{A1}$ and $R^{A2}$ include a methyl group, an ethyl group, a n-propyl group, an isopropyl group, various butyl groups (the term "various" means that a linear group and various branched groups are included, and the same holds true for the following), various pentyl groups, and various hexyl groups. An example of the alkoxy group represented by each of $R^{A1}$ and $R^{A2}$ is an alkoxy group whose alkyl group moiety is the alkyl group described above.

$R^{A1}$ and $R^{A2}$ each preferably represent an alkyl group having 1 to 4 carbon atoms or an alkoxy group having 1 to 4 carbon atoms.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred.

a and b each independently represent an integer of from 0 to 4, preferably from 0 to 2, more preferably 0 or 1.

In the present invention, the aromatic polycarbonate resin (A) preferably contains a polycarbonate resin having a bisphenol A structure from the viewpoints of, for example, the transparency, mechanical characteristics, and thermal characteristics of a molded body to be obtained. The polycarbonate resin having a bisphenol A structure is specifically, for example, such a resin that X in the formula (I) represents an isopropylidene group. The content of the polycarbonate resin having a bisphenol A structure in the aromatic polycarbonate resin (A) is preferably from 50 mass % to 100 mass %, more preferably from 75 mass % to 100 mass %, still more preferably from 85 mass % to 100 mass %.

In the present invention, the viscosity-average molecular weight (Mv) of the aromatic polycarbonate resin (A) is generally from about 10,000 to about 50,000, preferably from 13,000 to 35,000, more preferably from 14,000 to 20,000.

In the present invention, the viscosity-average molecular weight (Mv) is calculated from the following equation by using a limiting viscosity [η] determined through the measurement of the viscosity of a methylene chloride solution at 20° C. with an Ubbelohde-type viscometer.

[η]=1.23×10$^{-5}$Mv$^{0.83}$

The polycarbonate resin molding material to be used in the present invention preferably contains at least one compound selected from the polyether compound (b1) having a polyoxyalkylene structure and the acid-generating compound (b2). Thus, even when the material is molded under a high-temperature condition largely exceeding 300° C., an aromatic polycarbonate resin molded body reduced in yellowing and excellent in light transmission property can be obtained. Although the reason why the effect is obtained is uncertain, the compound is assumed to suppress the production of o-hydroxyacetophenone described in the foregoing.

(Polyether Compound (b1) Having Polyoxyalkylene Structure)

The polyether compound (b1) having a polyoxyalkylene structure to be used in the present invention preferably has a polyoxyalkylene structure represented by (R$^{b1}$O)$_m$ and a polyoxyalkylene structure represented by (R$^{b2}$O)$_n$. In the formulae, R$^{b1}$ and R$^{b2}$ each independently represent an alkylene group having 1 or more carbon atoms, and m+n is 5 or more and less than 300, preferably from 10 to 200, more preferably from 20 to 100.

Examples of the alkylene group represented by each of R$^{b1}$ and R$^{b2}$ include a methylene group, an ethylene group, a trimethylene group, a propylene group, a tetramethylene group, and a hexamethylene group. Among them, an alkylene group having 1 to 5 carbon atoms is preferred.

In m R$^{b1}$O groups, a plurality of R$^{b1}$'s may represent alkylene groups identical to each other, or may represent alkylene groups different from each other in number of carbon atoms. That is, a polyoxyalkylene group represented by (R$^{b1}$O)$_m$ is not limited to a group having a single oxyalkylene unit as a repeating unit, such as a polyoxyethylene group or a polyoxypropylene group, and may be a group having a plurality of oxyalkylene units different from each other in number of carbon atoms, such as an oxyethylene unit and an oxypropylene unit, as repeating units.

In addition, the same description as that of R$^{b1}$ holds true for R$^{b2}$, and in n R$^{b2}$O groups, a plurality of R$^{b2}$'s may represent alkylene groups identical to each other, or may represent alkylene groups different from each other in number of carbon atoms.

In addition, the polyether compound (b1) is preferably at least one selected from a compound (b1-1) represented by the following formula (II), an alkylene oxide adduct of a polyhydric alcohol and an ester thereof (b1-2), and a cyclic polyether compound (b1-3):

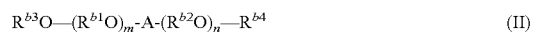

(II)

wherein R$^{b1}$ and R$^{b2}$ each independently represent an alkylene group having 1 or more carbon atoms, and m+n is 5 or more and less than 300, R$^{b3}$ and R$^{b4}$ each independently represent a hydrogen atom, a hydrocarbon group having 1 to 30 carbon atoms, an alkanoyl group having 1 to 30 carbon atoms, an alkenoyl group having 2 to 30 carbon atoms, or a glycidyl group, and A represents a single bond or a divalent organic group.

The alkylene group represented by each of R$^{b1}$ and R$^{b2}$ is as described above. The polyoxyalkylene structure represented by (R$^{b1}$O)$_m$ and the polyoxyalkylene structure represented by (R$^{b2}$O)$_n$ are also as described above.

Examples of the hydrocarbon group having 1 to 30 carbon atoms represented by each of R$^{b3}$ and R$^{b4}$ include an alkyl group having 1 to 30 carbon atoms, an alkenyl group having 2 to 30 carbon atoms, an aryl group having 6 to 30 carbon atoms, and an aralkyl group having 7 to 30 carbon atoms.

Each of the alkyl group and the alkenyl group may be linear, branched, or cyclic. Examples thereof include a methyl group, an ethyl group, a n-propyl group, an isopropyl group, various butyl groups, various pentyl groups, various hexyl groups, various octyl groups, a cyclopentyl group, a cyclohexyl group, an allyl group, a propenyl group, various butenyl groups, various hexenyl groups, various octenyl groups, a cyclopentenyl group, and a cyclohexenyl group. Examples of the aryl group include a phenyl group, a tolyl group, and a xylyl group. Examples of the aralkyl group include a benzyl group, a phenethyl group, and a methylbenzyl group.

The alkanoyl group having 1 to 30 carbon atoms represented by each of $R^{b3}$ and $R^{b4}$ may be linear or branched, and examples thereof include a methanoyl group, an ethanoyl group, a n-propanoyl group, an isopropanoyl group, a n-butanoyl group, a t-butanoyl group, a n-hexanoyl group, a n-octanoyl group, a n-decanoyl group, a n-dodecanoyl group, and a benzoyl group. Among them, an alkanoyl group having 1 to 20 carbon atoms is preferred from the viewpoints of the compatibility, heat stability, and ease of production of the composition.

The alkenoyl group having 2 to 30 carbon atoms represented by each of $R^{b3}$ and $R^{b4}$ may be linear or branched, and examples thereof include an ethenoyl group, a n-propenoyl group, an isopropenoyl group, a n-butenoyl group, a t-butenoyl group, a n-hexenoyl group, a n-octenoyl group, a n-decenoyl group, and a n-dodecenoyl group. Among them, an alkenoyl group having 2 to 10 carbon atoms is preferred, and an alkenoyl group having 2 to 6 carbon atoms is more preferred from the viewpoint that the molecular weight of the composition is reduced, from the viewpoints of its compatibility and solubility, and from the viewpoint of its ease of production.

The divalent organic group represented by A is, for example, a group represented by the following formula (a).

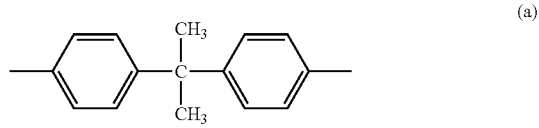

(a)

Specific examples of the compound (b1-1) represented by the formula (II) include polyethylene glycol, polypropylene glycol, polytetramethylene glycol, polyoxytetramethylene-polyoxyethylene glycol, polyoxyethylene monomethyl ether, polyoxyethylene dimethyl ether, polyoxyethylene-bisphenol A ether, polyoxypropylene-bisphenol A ether, polyoxyethylene-polyoxypropylene-bisphenol A ether, polyethylene glycol-allyl ether, polyethylene glycol-diallyl ether, polypropylene glycol-allyl ether, polypropylene glycol-diallyl ether, polyethylene glycol-polypropylene glycol-allyl ether, polyethylene glycol dimethacrylate, polypropylene glycol dimethacrylate, and polypropylene glycol distearate. Those compounds are available as commercial products, and for example, "UNIOX (trademark)", "UNIOL (trademark)", "UNILUB (trademark)", "UNISAFE (trademark)", "POLYCERIN (trademark)", or "EPIOL (trademark)", which is manufactured by NOF Corporation, can be used.

In the alkylene oxide adduct of a polyhydric alcohol and the ester thereof (b1-2), examples of the polyhydric alcohol include glycerin, diglyceryl ether, and sorbitol.

Specific examples of the cyclic polyether compound (b1-3) include 18-crown-6 and dibenzo-18-crown-6.

The number-average molecular weight of the polyether compound (b1), which is not particularly limited, is preferably from 200 to 10,000, more preferably from 500 to 8,000, still more preferably from 1,000 to 5,000.

One kind of the polyether compounds (b1) can be used alone, or two or more kinds thereof can be used in combination.

From the viewpoint that the production of o-hydroxyacetophenone is suppressed, and hence even when the polycarbonate resin molding material to be used in the present invention is molded under a high-temperature condition largely exceeding 300° C., an aromatic polycarbonate resin molded body reduced in yellowing and excellent in light transmission property is obtained, the content of the polyether compound (b1) in the material is preferably from 0.01 part by mass to 5 parts by mass, more preferably from 0.02 part by mass to 2 parts by mass, still more preferably from 0.03 part by mass to 1 part by mass with respect to 100 parts by mass of the aromatic polycarbonate resin (A).

(Acid-Generating Compound (b2))

Examples of the acid-generating compound (b2) to be used in the present invention include anhydrides of acidic compounds, such as a carboxylic acid, a sulfonic acid, and a boronic acid, and esters of the acidic compounds. From the viewpoint that the production of o-hydroxyacetophenone is suppressed, and hence even when the polycarbonate resin molding material is molded under a high-temperature condition largely exceeding 300° C., an aromatic polycarbonate resin molded body reduced in yellowing and excellent in light transmission property is obtained, the acid-generating compound (b2) is preferably at least one selected from a boronic acid anhydride and a sulfonate, more preferably at least one selected from a boronic acid anhydride having an aromatic ring and a sulfonate having an aromatic ring.

The boronic acid anhydride is preferably an arylboronic acid anhydride that may have a substituent on an aromatic ring thereof, and examples thereof include phenylboronic acid anhydride, 4-methylphenylboronic acid anhydride, 4-methoxyphenylboronic acid anhydride, 4-tert-butoxyphenylboronic acid anhydride, and 4-fluorophenylboronic acid anhydride. From the viewpoint of the heat stability of the polycarbonate resin molding material, at least one selected from phenylboronic acid anhydride and 4-methoxyphenylboronic acid anhydride is more preferred.

The sulfonate is preferably an alkyl ester of p-toluenesulfonic acid. The alkyl ester preferably has 1 to 20 carbon atoms, and more preferably has 1 to 12 carbon atoms, and examples thereof include butyl p-toluenesulfonate, octyl p-toluenesulfonate, and dodecyl p-toluenesulfonate. From the viewpoints of the ease with which the acid-generating compound generates an acid and the ease with which a decomposition product thereof volatilizes, at least one selected from butyl p-toluenesulfonate and octyl p-toluenesulfonate is more preferred.

One kind of the acid-generating compounds (b2) can be used alone, or two or more kinds thereof can be used in combination.

From the viewpoint that the production of o-hydroxyacetophenone is suppressed, and hence even when the polycarbonate resin molding material is molded under a high-temperature condition largely exceeding 300° C., an aromatic polycarbonate resin molded body reduced in yellowing and excellent in light transmission property is obtained, the content of the acid-generating compound (b2) in the material is preferably from 0.0001 part by mass to 0.5 part by mass with respect to 100 parts by mass of the aromatic polycarbonate resin (A).

In addition, from the same viewpoint as that described above, when the acid-generating compound (b2) is a boronic acid anhydride, its content is more preferably from 0.01 part by mass to 0.5 part by mass, still more preferably from 0.02 part by mass to 0.5 part by mass with respect to 100 parts by mass of the aromatic polycarbonate resin (A). On the other hand, when the acid-generating compound (b2) is a sulfonate, its content is more preferably from 0.0001 part by mass to 0.1 part by mass, still more preferably from 0.0001 part by mass to 0.01 part by mass with respect to 100 parts by mass of the aromatic polycarbonate resin (A).

It should be noted that in the polycarbonate resin molding material to be used in the present invention, the polyether compound (b1) and the acid-generating compound (b2) may be used in combination. In that case, the respective preferred contents of the polyether compound (b1) and the acid-generating compound (b2) are the same as those described in the foregoing.

(Antioxidant (C))

The polycarbonate resin molding material to be used in the present invention preferably further contains an antioxidant (C). When the material contains the antioxidant (C), its oxidation deterioration is prevented even when molded under a high-temperature condition, and hence an aromatic polycarbonate resin molded body reduced in yellowing and excellent in light transmission property can be obtained.

Examples of the antioxidant (C) include a phosphorus-based antioxidant and a hindered phenol-based antioxidant. antioxidant having an aryl group to be preferably used in the present invention is excellent in hydrolysis resistance and is reduced in production amount of the compound having a phenol structure. It should be noted that the amount of the compound having a phenol structure is determined with a gas chromatograph.

The antioxidant (C) to be used in the present invention is preferably a phosphorus-based antioxidant having an aryl group and a phosphite structure, more preferably a pentaerythritol diphosphite compound represented by the following formula (III).

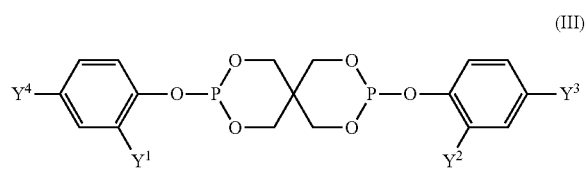

(III)

In the formula, $Y^1$ to $Y^4$ each independently represent a hydrocarbon group having 6 or more carbon atoms, and preferably each independently represent a substituted or unsubstituted cumyl group, a substituted or unsubstituted phenyl group, a substituted or unsubstituted naphthyl group, or a substituted or unsubstituted biphenyl group.

The antioxidant (C) to be used in the present invention is more preferably a pentaerythritol diphosphite compound represented by the following formula (III-1).

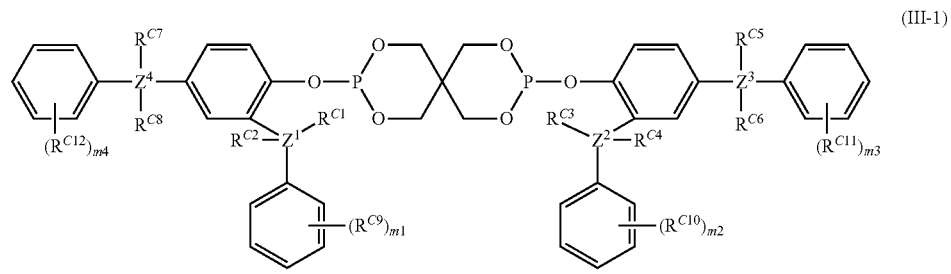

(III-1)

From the viewpoint of the suppression of the oxidation deterioration of the polycarbonate resin molding material at the time of its high-temperature molding, a phosphorus-based antioxidant is preferably used and a phosphorus-based antioxidant having an aryl group is more preferred.

Further, from the viewpoints that the phosphorus-based antioxidant having an aryl group is reduced in thermal decomposition even in molding under a high-temperature condition, that the antioxidant can suppress the oxidation deterioration of the polycarbonate resin molding material, and that a molded body reduced in the occurrence of yellowing and a reduction in light transmittance is obtained, the antioxidant is preferably such a compound that the amount of a compound having a phenol structure produced by the decomposition of the compound 1,500 hours after its standing under the conditions of 40° C. and a humidity of 90% is preferably 5 mass % or less, more preferably 3 mass % or less, still more preferably 1 mass % or less, particularly preferably 0.5 mass % or less. That is, the phosphorus-based In the formula, $R^{C1}$ to $R^{C8}$ each independently represent an alkyl group or an alkenyl group, $R^{C1}$ and $R^{C2}$, $R^{C3}$ and $R^{C4}$, $R^{C5}$ and $R^{C6}$, or $R^{C7}$ and $R^{C8}$ may be bonded to each other to form a ring, $R^{C9}$ to $R^{C12}$ each independently represent a hydrogen atom or an alkyl group, m1 to m4 each independently represent an integer of from 0 to 5, and $Z^1$ to $Z^4$ each independently represent a single bond or a carbon atom, and when $Z^1$ to $Z^4$ each represent a single bond, $R^{C1}$ to $R^{C8}$ are excluded from the formula (III-1).

The pentaerythritol diphosphite compound represented by the formula (III) or (III-1) can be obtained by adding a chlorine-based solvent to phosphorus trichloride and pentaerythritol to provide pentaerythritol dichlorophosphite, and then heating and mixing the contents in the presence of an aromatic solvent and an organic nitrogen-containing basic compound (see, for example, JP 2004-018406 A).

Among the pentaerythritol diphosphite compounds each represented by the formula (III) or (III-1), bis(2,4-dicumylphenyl)pentaerythritol diphosphite represented by the following formula (III-2) is particularly suitable because the compound can satisfactorily impart heat resistance and hydrolysis resistance to the polycarbonate resin molding material, and is easily available. The compound is available as a commercial product, and for example, "Doverphos (trademark) S-9228PC" manufactured by Dover Chemical can be used.

thereto. The refractive index of the polyorganosiloxane is preferably 1.45 or more, more preferably 1.50 or more, still more preferably 1.52 or more because the refractive index of the aromatic polycarbonate resin (A) is 1.58.

[Method of Producing Polycarbonate Resin Molding Material]

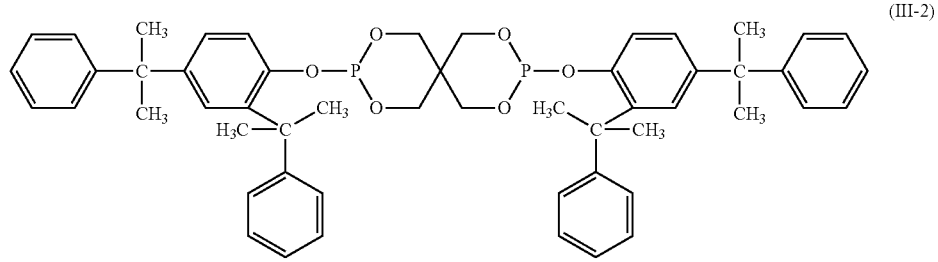 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

(III-2)

One kind of the antioxidants (C) can be used alone, or two or more kinds thereof can be used in combination.

The content of the antioxidant (C) in the polycarbonate resin molding material to be used in the present invention is preferably from 0.005 part by mass to 1 part by mass, more preferably from 0.01 part by mass to 0.8 part by mass, still more preferably from 0.03 part by mass to 0.25 part by mass with respect to 100 parts by mass of the aromatic polycarbonate resin (A) from the viewpoint of the suppression of its oxidation deterioration.

(Additive)

In addition to the components described above, a polyorganosiloxane or the like can be appropriately added to the polycarbonate resin molding material to be used in the present invention.

The polyorganosiloxane is preferably a compound having one or more kinds of functional groups such as an alkoxy group, an aryloxy group, a polyoxyalkylene group, a carboxyl group, a silanol group, an amino group, a mercapto group, an epoxy group, and a vinyl group.

The addition amount of the polyorganosiloxane is preferably from 0.01 part by mass to 0.15 part by mass, more preferably from 0.02 part by mass to 0.15 part by mass, still more preferably from 0.05 part by mass to 0.1 part by mass with respect to 100 parts by mass of the aromatic polycarbonate resin (A). When the addition amount falls within the range of from 0.01 part by mass to 0.15 part by mass, the polyorganosiloxane can concert with any other component to improve the releasability of the molding material. Further, even under a high-temperature molding condition largely exceeding 300° C., in particular, a continuous molding condition, the occurrence of silver and the amount of a mold deposit can be significantly reduced.

The viscosity of the polyorganosiloxane at 25° C. is preferably 10 mm$^2$/s or more from the viewpoint of a lubricating effect serving as the releasability, and is preferably 200 mm$^2$/s or less from the viewpoint of its dispersibility in the polycarbonate resin. From the viewpoints, the viscosity of the polyorganosiloxane falls within the range of more preferably from 20 mm$^2$/s to 150 mm$^2$/s, still more preferably from 40 mm$^2$/s to 120 mm$^2$/s.

A difference between the refractive index of the polyorganosiloxane and the refractive index of the polycarbonate resin is preferably made as small as possible in order that the transparency of the polycarbonate resin molding material may not be reduced upon addition of the polyorganosiloxane A method of producing the polycarbonate resin molding material to be used in the present invention is not particularly limited.

For example, the aromatic polycarbonate resin (A), and as required, the compounds (b1) and (b2), the antioxidant (C), and various additives are mixed, and the mixture is melted and kneaded. The melting and kneading can be performed by a typically used method, for example, a method using a ribbon blender, a Henschel mixer, a Banbury mixer, a drum tumbler, a single-screw extruder, a double-screw extruder, a co-kneader, a multiple-screw extruder, or the like. In normal cases, a heating temperature at the time of the melting and kneading is appropriately selected from the range of from about 220° C. to about 300° C.

(Method of Producing Aromatic Polycarbonate Resin Molded Body)

The aromatic polycarbonate resin molded body of the present invention is obtained by molding the polycarbonate resin molding material. Specifically, the aromatic polycarbonate resin molded body can be produced by using the melt-kneaded product of the polycarbonate resin molding material or the resultant resin pellet as a raw material through the application of a known molding method, such as a hollow molding method, an injection molding method, an injection compression molding method, an extrusion molding method, a vacuum molding method, a blow molding method, a press molding method, an air-pressure molding method, an expansion molding method, a heat bending molding method, a compression molding method, a calender molding method, or a rotational molding method.

A molding method requiring the molding material to have high flowability, such as an injection molding method, is preferably used because the aromatic polycarbonate resin molded body of the present invention has a thin-walled portion having a thickness of 0.5 mm or less. A condition for the molding is not particularly limited, but the molding is preferably performed at 300° C. or more because the molded body has the thin-walled portion. Thus, the optical distortion of the molded body to be obtained can be reduced, and a fine processing portion, such as a prism portion, can be satisfactorily transferred. The molding temperature is more preferably from 310° C. to 360° C.

[Light-Guiding Plate]

The aromatic polycarbonate resin molded body of the present invention is useful in an optical molded article application, especially a light-guiding plate application.

A light-guiding plate formed of the aromatic polycarbonate resin molded body of the present invention is not particularly limited as long as the plate has a thin-walled portion having a thickness of 0.5 mm or less, and the plate may be a flat plate, or may be a curved plate or prism transfer plate having a lens effect. A preferred size and a preferred thickness of the light-guiding plate are the same as those of the molded body. A method of molding the light-guiding plate is also not particularly limited, and needs only to be appropriately selected. A preferred method of producing the light-guiding plate is also the same as the method of producing the molded body.

EXAMPLES

The present invention is described by way of Examples but the present invention is not limited to these Examples.

Production examples of bisphenol A polycarbonate resins (PC-1) to (PC-3) used in Examples and Comparative Examples are described below.

Production Example 1

Production of Bisphenol A Polycarbonate Resin (PC-1)

4 kg of "TARFLON FN1500" (manufactured by Idemitsu Kosan Co., Ltd., bisphenol A polycarbonate resin, viscosity-average molecular weight: 14,500) was dissolved in 25 L of methylene chloride, and in a washing machine with a baffle board and a stirring blade, the solution was vigorously stirred and mixed with 5 L of 0.03 mol/L aqueous sodium hydroxide, 5 L of 0.2 mol/L hydrochloric acid, and 5 L of pure water in the stated order, followed by standing separation. After it had been confirmed that the electric conductivity of an aqueous phase had become 0.05 ρS/m or less, pure water was further added to the resultant, and the contents were stirred and mixed once. A solution of the polycarbonate resin in dichloromethane obtained by the washing was concentrated and pulverized, and the resultant flake was dried at 100° C. under reduced pressure to provide the bisphenol A polycarbonate resin (PC-1).

Production Example 2

Production of Bisphenol A Polycarbonate Resin (PC-2)

(1) Polycarbonate Oligomer Synthesis Step 2,000 parts per million by mass of sodium dithionite with respect to bisphenol A (hereinafter sometimes abbreviated as "BPA") to be dissolved later was added to 5.6 mass % aqueous sodium hydroxide, and bisphenol A was dissolved in the mixture so that a bisphenol A concentration became 13.5 mass %. Thus, a solution of bisphenol A in aqueous sodium hydroxide was prepared. 40 L/hr of the solution of bisphenol A in aqueous sodium hydroxide, 15 L/hr of methylene chloride, and 4.0 kg/hr of phosgene were continuously passed through a tubular reactor having an inner diameter of 6 mm and a tube length of 30 m. The tubular reactor had a jacket portion, and the temperature of a reaction liquid was kept at 40° C. or less by passing cooling water through the jacket.

The reaction liquid that had exited the tubular reactor was continuously introduced into a baffled tank reactor having an internal volume of 40 L, the reactor including a sweptback blade, and 2.8 L/hr of the solution of bisphenol A in aqueous sodium hydroxide, 0.07 L/hr of 25 mass % aqueous sodium hydroxide, 17 L/hr of water, and 0.64 L/hr of a 1 mass % aqueous solution of triethylamine were further added to the liquid to perform a reaction.

The reaction liquid overflowing the tank reactor was continuously extracted, and an aqueous phase was separated and removed by leaving the liquid at rest, followed by the collection of a methylene chloride phase. The resultant polycarbonate oligomer had a concentration of 325 g/L and a chloroformate group concentration of 0.77 mol/L.

(2) Polycarbonate Polymerization Step

After the temperature of the cooling solvent of a 50-liter tank reactor including a baffle board, a paddle-type stirring blade, and a cooling jacket had become 20° C. or less, 15 L of the oligomer solution, 8.9 L of methylene chloride, 119 g of p-tert-butylphenol, 0.7 mL of triethylamine, and a solution of BPA in aqueous sodium hydroxide (obtained by dissolving, in an aqueous solution obtained by dissolving 647 g of NaOH and 2,000 ppm by mass of sodium dithionite with respect to BPA to be dissolved later in 9.5 L of water, 1,185 g of BPA) were added to perform a polymerization reaction for 30 minutes. After that, 0.8 mL of triethylamine was added to the resultant and the mixture was stirred for 30 minutes.

15 L of methylene chloride was added to the mixture for dilution, and then the diluted mixture was separated into an organic phase containing a polycarbonate resin, and an aqueous phase containing excess amounts of BPA and NaOH, followed by the isolation of the organic phase. The resultant solution of the polycarbonate resin in methylene chloride was sequentially washed with 0.03 mol/L aqueous NaOH and 0.2 mol/L hydrochloric acid in amounts of 15 vol % each with respect to the solution, and then washing with pure water was repeated until an electric conductivity in an aqueous phase after the washing became 0.05 lpS/m or less. A solution of the polycarbonate resin in dichloromethane obtained by the washing was concentrated and pulverized, and the resultant flake was dried at 100° C. under reduced pressure to provide the bisphenol A polycarbonate resin (PC-2).

Production Example 3

Production of Bisphenol A Polycarbonate Resin (PC-3)

The bisphenol A polycarbonate resin (PC-3) was obtained in the same manner as in Production Example 2 except that in the polycarbonate polymerization step, after the temperature of the cooling solvent had become 30° C. or less, 1.5 mL of triethylamine was added in one portion instead of the addition of triethylamine in portions, and a polymerization reaction was performed for 60 minutes.

Examples 1 to 11 and Comparative Examples 1 to 5

After respective components had been mixed at ratios shown in Table 1, the mixture was melted and kneaded with a vented single screw extruder having a screw diameter of 40 mm ("VS-40" manufactured by Tanabe Plastics Machinery Co., Ltd.) at a cylinder temperature of 250° C., and the melt-kneaded product was extruded to provide a resin pellet (polycarbonate resin molding material). The resin pellet was dried at 110° C. for 5 hours, and was then molded into a flat plate-shaped molded body measuring 50 mm by 80 mm by 0.3 mm thick with an injection molding machine "NISSEI ES 1000" (manufactured by Nissei Plastic Industrial Co., Ltd., clamping force: 80 t) at a cylinder temperature of 360° C. and a die temperature of 80° C. for a cycle time of 20 seconds. The measurement of the content of o-hydroxyacetophenone and signal analysis by proton NMR were performed by using the molded body.

It should be noted that the components used in Examples and Comparative Examples, and the aromatic polycarbonate resin molded bodies obtained in Examples and Comparative Examples were subjected to various evaluations by the following methods.

[Measurement of Viscosity-Average Molecular Weight (Mv)]

A viscosity-average molecular weight was calculated from the following equation after the determination of a limiting viscosity [η] through the measurement of the viscosity of a methylene chloride solution at 20° C. with an Ubbelohde-type viscometer.

$$[\eta]=1.23\times10^{-5}Mv^{0.83}$$

[Hydrolysis Resistance Test of Phosphorus-Based Antioxidant]

A phosphorus-based antioxidant was left to stand under the conditions of 40° C. and a humidity of 90% for 1,500 hours. After that, the mass of a compound having a phenol structure produced by the decomposition of the phosphorus-based antioxidant was determined with a gas chromatograph apparatus "GC-2014" manufactured by Shimadzu Corporation, and the ratio of the compound to the phosphorus-based antioxidant was measured.

[Measurement of Absorption Spectrum]

6 g of each of the molded bodies obtained in Examples and Comparative Examples was dissolved in 50 mL of methylene chloride, and the absorption spectrum of the solution in the wavelength range of from 350 nm to 780 nm was measured with a quartz cell having an optical path length of 5 cm and a UV-visible spectrophotometer "UV-2450" (manufactured by Shimadzu Corporation). A spectral difference spectrum was measured by using a solution obtained by similarly dissolving 6 g of the aromatic polycarbonate resin used in each of Examples and Comparative Examples in methylene chloride on a reference side, and the presence or absence of an absorption maximum in the wavelength range of from 500 nm to 600 nm was confirmed.

It should be noted that in each of Examples 1 to 11, and Comparative Examples 1 to 3 and 5, no absorption was observed in the wavelength range of from 500 nm to 600 nm.

[Measurement of Content of o-Hydroxyacetophenone]

Each of the molded bodies obtained in Examples and Comparative Examples was pulverized and dissolved in chloroform. After that, acetone was added to the solution and a precipitated resin content was removed. o-Hydroxyacetophenone in the solution after the removal of the resin content was determined by high-performance liquid chromatography.

[Measurement of Nitrogen Atom Content]

Each of the molded bodies obtained in Examples and Comparative Examples was pulverized, and its nitrogen atom content was measured with a microanalyzer "TS-100" (manufactured by Mitsubishi Chemical Analytech Co., Ltd., mounted with a detector for nitrogen analysis: ND-100) by a chemiluminescence method under the conditions of a sample amount of from 1 mg to 20 mg and a combustion temperature of 1,000° C.

[Measurement of Proton NMR Spectrum]

A proton NMR spectrum was measured by using each of the molded bodies obtained in Examples and Comparative Examples under the following conditions, and the ratio of a total signal intensity observed in the chemical shift region of from 6.3 ppm or more to 6.7 ppm or less when a total signal intensity observed in the chemical shift region of from 1.5 ppm or more to 1.9 ppm or less was defined as 100 was determined. A chemical shift value was determined with reference to a signal (1.67 ppm) of a proton of the isopropylidene group of bisphenol A in the aromatic polycarbonate resin.

Measuring apparatus: "ECA 500" (manufactured by JEOL RESONANCE Inc.)
Measurement solvent: $CDCl_3$
Flip angle: 45°
Repetition time: 9 seconds
Cumulative number: 256 times
Observed range: 20 ppm
Observation center: 5 ppm

[Measurement of YI Value]

A resin pellet was dried at 110° C. for 5 hours, and was then molded into flat plate-shaped molded bodies each measuring 50 mm by 90 mm by 5 mm thick with an injection molding machine "NISSEI ES 1000" (manufactured by Nissei Plastic Industrial Co., Ltd., clamping force: 80 t) at cylinder preset temperatures of 280° C. and 360° C., and a die temperature of 80° C. for a cycle time of 50 seconds.

The YI values of the resultant molded bodies were measured with a spectrophotometer "U-4100" (manufactured by Hitachi High-Technologies Corporation) under the conditions of a C light source and a two-degree field of view. It should be noted that an acceptance criterion is as follows: the YI value of the molded body obtained by the molding at 360° C. is 1.21 or less.

[Measurement of L Value]

The L values of the flat plate-shaped molded bodies each measuring 50 mm by 90 mm by 5 mm thick produced at a cylinder preset temperature of 360° C., and a die temperature of 80° C. for a cycle time of 50 seconds were measured with a spectrophotometer "U-4100" (manufactured by Hitachi High-Technologies Corporation) under the conditions of a D65 light source and a ten-degree field of view.

[Component Composition]

Components used in Examples and Comparative Examples are as described below.

<Aromatic Polycarbonate Resin (A)>

(A1): "TARFLON FN1500" (manufactured by Idemitsu Kosan Co., Ltd., bisphenol A polycarbonate resin, viscosity-average molecular weight: 14,500)

(A2): TARFLON FN1200 (manufactured by Idemitsu Kosan Co., Ltd., bisphenol A polycarbonate resin, viscosity-average molecular weight: 11,500)

(A3): bisphenol A polycarbonate resin (PC-1) obtained in Production Example 1 (viscosity-average molecular weight: 14,300)

(A4): bisphenol A polycarbonate resin (PC-2) obtained in Production Example 2 (viscosity-average molecular weight: 14,200)

(A5): bisphenol A polycarbonate resin (PC-3) obtained in Production Example 3 (viscosity-average molecular weight: 14,600)

<Polyether Compound (b1) having Polyoxyalkylene Structure>

(b1-1): "POLYCERIN DC-1100" (manufactured by NOF Corporation, polyoxytetramethylene glycol-polyoxyethylene glycol)

(b1-2): "POLYCERIN DC-3000E" (manufactured by NOF Corporation, polyoxytetramethylene glycol-polyoxyethylene glycol)

(b1-3): "UNIOX GT-201S" (manufactured by NOF Corporation, polyoxyethylene-triisostearic acid)
(b1-4): "UNILUB 50DB-22" (manufactured by NOF Corporation, polyoxyethylene-polyoxypropylene-bisphenol A ether)
(b1-5): "EPIOL E-1000" (manufactured by NOF Corporation, polyethylene glycol diglycidyl ether)
<Acid-Generating Compound (b2)>
(b2-1): phenylboronic acid anhydride (manufactured by Hokko Chemical Industry Co., Ltd.)
(b2-2): 4-methoxyphenylboronic acid anhydride (manufactured by Hokko Chemical Industry Co., Ltd.)
(b2-3): butyl p-toluenesulfonate (manufactured by Wako Pure Chemical Industries, Ltd.)
(b2-4): octyl p-toluenesulfonate (manufactured by Wako Pure Chemical Industries, Ltd.)

<Antioxidant (C)>
(C1): "Doverphos S-9228PC" (manufactured by Dover Chemical Corporation, bis(2,4-dicumylphenyl)pentaerythritol diphosphite, production amounts of dicumylphenol after a hydrolysis resistance test: 0.15 mass %)
(C2): "ADK STAB 2112" (manufactured by ADEKA Corporation, tris-2,4-di-tert-butylphenyl phosphite, production amounts of 2,4-di-tert-butylphenol after a hydrolysis resistance test: 6 mass %)
<Other Components>
"MACROLEX VIOLET 3R" (manufactured by LANXESS AG, a bluing agent having an absorption maximum at a wavelength of 558 nm)
"PSJ-POLYSTYRENE GPPS 679" (manufactured by PS Japan Corporation, polystyrene)

TABLE 1

| | | | | Example | | | | | |
|---|---|---|---|---|---|---|---|---|---|
| | | | Unit | 1 | 2 | 3 | 4 | 5 | 6 |
| Resin molding material composition | Aromatic polycarbonate resin (A) | (A1) TARFLON FN1500 | Part(s) by mass | 100 | 100 | 100 | 100 | | |
| | | (A2) TARFLON FN1200 | | | | | | 100 | 100 |
| | | (A3) PC-1 | | | | | | | |
| | | (A4) PC-2 | | | | | | | |
| | | (A5) PC-3 | | | | | | | |
| | Polyether compound (b1) | (b1-1) POLYCERIN DC1100 | Part(s) by mass | 0.2 | | 0.4 | | | |
| | | (b1-2) POLYCERIN DC3000E | | | 0.2 | | | | |
| | | (b1-3) UNIOX GT-20IS | | | | | 0.2 | | |
| | | (b1-4) UNILUB 50DB-22 | | | | | | 0.2 | |
| | | (b1-5) EPIOL E-1000 | | | | | | | 0.2 |
| | Acid-generating compound (b2) | (b2-1) Phenylboronic acid anhydride | Part(s) by mass | | | | | | |
| | | (b2-2) 4-Methoxyphenylboronic acid anhydride | | | | | | | |
| | | (b2-3) Butyl p-toluenesulfonate | | | | | | | |
| | | (b2-4) Octyl p-toluenesulfonate | | | | | | | |
| | Antioxidant (C) | (C1) Doverphos S-9228PC | Part(s) by mass | 0.05 | 0.05 | 0.05 | 0.05 | 0.05 | 0.05 |
| | | (C2) ADK STAB 2112 | | | | | | | |
| | Other component | MACROLEX VIOLET 3R | ppb | | | | | | |
| | | PSJ-POLYSTYRENE GPPS 679 | Part(s) by mass | | | | | | |
| Evaluation result | | o-Hydroxyacetophenone content (molding at 360° C./50 mm by 80 mm by 0.3 mm thick) | ppm by mass* | 0.30 | 0.30 | 0.20 | 0.30 | 0.30 | 0.20 |
| | | Nitrogen atom content (molding at 360° C./50 mm by 80 mm by 0.3 mm thick) | ppm* | 8 | 8 | 8 | 8 | 10 | 10 |
| | | Presence or absence of absorption maximum in wavelength range of from 500 nm to 600 nm (molding at 360° C./50 mm by 80 mm by 0.3 mm thick) | — | A | A | A | A | A | A |
| | | Signal intensity ratio** of proton NMR (molding at 360° C./50 mm by 80 mm by 0.3 mm thick) | — | 0.07 | 0.07 | 0.07 | 0.07 | 0.09 | 0.09 |
| | | YI value (molding at 280° C./50 mm by 90 mm by 5 mm thick) | — | 1.00 | 1.00 | 0.90 | 1.08 | 1.11 | 1.02 |
| | | YI value (molding at 360° C./50 mm by 90 mm by 5 mm thick) | — | 1.01 | 1.05 | 0.95 | 1.11 | 1.13 | 1.08 |
| | | L value (molding at 360° C./50 mm by 90 mm by 5 mm thick) | — | 96.01 | 96.01 | 96.03 | 95.97 | 95.96 | 95.99 |

| | | | | Example | | | | |
|---|---|---|---|---|---|---|---|---|
| | | | Unit | 7 | 8 | 9 | 10 | 11 |
| Resin molding material composition | Aromatic polycarbonate resin (A) | (A1) TARFLON FN1500 | Part(s) by mass | 100 | 100 | 100 | | |
| | | (A2) TARFLON FN1200 | | | | | | |
| | | (A3) PC-1 | | | | | 100 | |
| | | (A4) PC-2 | | | | | | 100 |
| | | (A5) PC-3 | | | | | | |
| | Polyether compound (b1) | (b1-1) POLYCERIN DC1100 | Part(s) by mass | | | | | 0.3 |
| | | (b1-2) POLYCERIN DC3000E | | | | | | |
| | | (b1-3) UNIOX GT-20IS | | | | | | |
| | | (b1-4) UNILUB 50DB-22 | | | | | | |
| | | (b1-5) EPIOL E-1000 | | | | | | |
| | Acid-generating compound (b2) | (b2-1) Phenylboronic acid anhydride | Part(s) by mass | 0.2 | | | | |
| | | (b2-2) 4-Methoxyphenylboronic acid anhydride | | | 0.1 | | | |
| | | (b2-3) Butyl p-toluenesulfonate | | | | 0.001 | | |
| | | (b2-4) Octyl p-toluenesulfonate | | | | | 0.005 | |

TABLE 1-continued

|  |  |  | Unit |  |  |  |  |  |
|---|---|---|---|---|---|---|---|---|
| | Antioxidant (C) | (C1) Doverphos S-9228PC | Part(s) by mass | 0.05 | 0.05 | 0.05 | 0.05 | 0.05 |
| | | (C2) ADK STAB 2112 | | | | | | |
| | Other component | MACROLEX VIOLET 3R | ppb | | | | | |
| | | PSJ-POLYSTYRENE GPPS 679 | Part(s) by mass | | | | | |
| Evaluation result | o-Hydroxyacetophenone content (molding at 360° C./50 mm by 80 mm by 0.3 mm thick) | | ppm by mass* | 0.10 | 0.10 | 0.80 | 0.40 | 0.10 |
| | Nitrogen atom content (molding at 360° C./50 mm by 80 mm by 0.3 mm thick) | | ppm* | 8 | 8 | 8 | 7 | 4 |
| | Presence or absence of absorption maximum in wavelength range of from 500 nm to 600 nm (molding at 360° C./50 mm by 80 mm by 0.3 mm thick) | | — | A | A | A | A | A |
| | Signal intensity ratio** of proton NMR (molding at 360° C./50 mm by 80 mm by 0.3 mm thick) | | — | 0.07 | 0.07 | 007 | 0.07 | 0.08 |
| | YI value (molding at 280° C./50 mm by 90 mm by 5 mm thick) | | — | 1.01 | 1.04 | 1.04 | 1.03 | 0.90 |
| | YI value (molding at 360° C./50 mm by 90 mm by 5 mm thick) | | — | 1.11 | 1.09 | 1.16 | 1.11 | 0.92 |
| | L value (molding at 360° C./50 mm by 90 mm by 5 mm thick) | | — | 95.97 | 95.98 | 95.94 | 95.96 | 96.05 |

|  |  |  |  | Comparative Example | | | | |
|---|---|---|---|---|---|---|---|---|
|  |  |  | Unit | 1 | 2 | 3 | 4 | 5 |
| Resin molding material composition | Aromatic polycarbonate resin (A) | (A1) TARFLON FN1500 | Part(s) by mass | 100 | 100 | | | 100 |
| | | (A2) TARFLON FN1200 | | | | | | |
| | | (A3) PC-1 | | | | | 100 | |
| | | (A4) PC-2 | | | | | | |
| | | (A5) PC-3 | | | | 100 | | |
| | Polyether compound (b1) | (b1-1) POLYCERIN DC1100 | Part(s) by mass | | | 0.2 | | 0.005 |
| | | (b1-2) POLYCERIN DC3000E | | | | | | |
| | | (b1-3) UNIOX GT-20IS | | | | | | |
| | | (b1-4) UNILUB 50DB-22 | | | | | | |
| | | (b1-5) EPIOL E-1000 | | | | | | |
| | Acid-generating compound (b2) | (b2-1) Phenylboronic acid anhydride | Part(s) by mass | | | | | |
| | | (b2-2) 4-Methoxyphenylboronic acid anhydride | | | | | | |
| | | (b2-3) Butyl p-toluenesulfonate | | | | | | |
| | | (b2-4) Octyl p-toluenesulfonate | | | | | | |
| | Antioxidant (C) | (C1) Doverphos S-9228PC | Part(s) by mass | 0.05 | | 0.05 | | 0.05 |
| | | (C2) ADK STAB 2112 | | | 0.05 | | 0.05 | |
| | Other component | MACROLEX VIOLET 3R | ppb | | | | 100 | |
| | | PSJ-POLYSTYRENE GPPS 679 | Part(s) by mass | | | | | 0.05 |
| Evaluation result | o-Hydroxyacetophenone content (molding at 360° C./50 mm by 80 mm by 0.3 mm thick) | | ppm by mass* | 1.50 | 2.00 | 0.70 | 0.10 | 1.30 |
| | Nitrogen atom content (molding at 360° C./50 mm by 80 mm by 0.3 mm thick) | | ppm* | 8 | 8 | 20 | 7 | 10 |
| | Presence or absence of absorption maximum in wavelength range of from 500 nm to 600 nm (molding at 360° C./50 mm by 80 mm by 0.3 mm thick) | | — | A | A | A | P | A |
| | Signal intensity ratio** of proton NMR (molding at 360° C./50 mm by 80 mm by 0.3 mm thick) | | — | 0.07 | 0.07 | 0.10 | 0.23 | <0.05 |
| | YI value (molding at 280° C./50 mm by 90 mm by 5 mm thick) | | — | 1.22 | 1.23 | 1.28 | 1.01 | 1.15 |
| | YI value (molding at 360° C./50 mm by 90 mm by 5 mm thick) | | — | 1.27 | 1.35 | 1.43 | 1.30 | 1.25 |
| | L value (molding at 360° C./50 mm by 90 mm by 5 mm thick) | | — | 95.85 | 95.83 | 95.80 | 95.70 | 95.93 |

*Content in a molded body
**The ratio of a total signal intensity observed in the chemical shift region of from 6.3 ppm or more to 6.7 ppm or less when a total signal intensity observed in the chemical shift region of from 1.5 ppm or more to 1.9 ppm or less is defined as 100
A: Absent;
P: Present As can be seen from Table 1, the aromatic polycarbonate resin molded body of the present invention is reduced in yellowing and is excellent in light transmission property. In contrast, the yellowing of the polycarbonate resin molded body of Comparative Examples is remarkable.

INDUSTRIAL APPLICABILITY

According to the present invention, there can be provided an aromatic polycarbonate resin molded body that has a thin-walled portion having a thickness of 0.5 mm or less, is reduced in yellowing, and is excellent in light transmission property.

The invention claimed is:

1. An aromatic polycarbonate resin molded body, which is obtained by molding a resin molding material comprising an aromatic polycarbonate resin (A), wherein:

the molded body has a thin-walled portion having a thickness of 0.5 mm or less;

the molded body has an o-hydroxyacetophenone content of 1 ppm by mass or less and a nitrogen atom content of 15 ppm or less; and the molded body is free of an absorption maximum in a wavelength range of from 500 nm to 600 nm.

2. The aromatic polycarbonate resin molded body according to claim 1, wherein a length in a longitudinal direction of the molded body is 60 mm or more, and a thickness of a region accounting for at least 80% of the molded body is 0.7 mm or less.

3. The aromatic polycarbonate resin molded body according to claim 1, wherein when a total signal intensity observed in a chemical shift region of from 1.5 ppm or more to 1.9 ppm or less at a time of measurement of a proton NMR spectrum is defined as 100, the molded body has a ratio of a total signal intensity observed in a chemical shift region of from 6.3 ppm or more to 6.7 ppm or less of 0.15 or less.

4. The aromatic polycarbonate resin molded body according to claim 1, wherein the resin molding material further comprises a polyether compound (b1) having a polyoxyalkylene structure.

5. The aromatic polycarbonate resin molded body according to claim 1, wherein the resin molding material further comprises an acid-generating compound (b2).

6. The aromatic polycarbonate resin molded body according to claim 5, wherein the acid-generating compound (b2) comprises at least one selected from a boronic acid anhydride and a sulfonate.

7. The aromatic polycarbonate resin molded body according to claim 4, wherein a content of the polyether compound (b1) is from 0.01 part by mass to 5 parts by mass with respect to 100 parts by mass of the aromatic polycarbonate resin (A).

8. The aromatic polycarbonate resin molded body according to claim 5, wherein a content of the acid-generating compound (b2) is from 0.0001 part by mass to 0.5 part by mass with respect to 100 parts by mass of the aromatic polycarbonate resin (A).

9. The aromatic polycarbonate resin molded body according to claim 1, wherein the aromatic polycarbonate resin (A) has a viscosity-average molecular weight (Mv) of from 10,000 to 50,000.

10. A light-guiding plate, comprising the aromatic polycarbonate resin molded body of claim 1.

* * * * *

UNITED STATES PATENT AND TRADEMARK OFFICE
CERTIFICATE OF CORRECTION

PATENT NO. : 9,670,316 B2
APPLICATION NO. : 15/035288
DATED : June 6, 2017
INVENTOR(S) : Masami Takimoto et al.

Page 1 of 1

It is certified that error appears in the above-identified patent and that said Letters Patent is hereby corrected as shown below:

On the Title Page

Item (87), the WIPO Publication date is incorrect. Item (87) should read:
--(87)  PCT Pub. No.:  WO2015/068844
        PCT Pub. Date: May 14, 2015--

Signed and Sealed this
Seventeenth Day of April, 2018

Andrei Iancu
*Director of the United States Patent and Trademark Office*